US010088661B2

(12) United States Patent
Kalkbrenner et al.

(10) Patent No.: US 10,088,661 B2
(45) Date of Patent: Oct. 2, 2018

(54) ADJUSTING MECHANISM OF A SAMPLE HOLDER, MICROSCOPE WITH ADJUSTING MECHANISM, AND METHOD

(71) Applicant: Carl Zeiss Microscopy GmbH, Jena (DE)

(72) Inventors: Thomas Kalkbrenner, Jena (DE); Saskia Pergande, Sulza (DE); Tobias Kaufhold, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 15/431,894

(22) Filed: Feb. 14, 2017

(65) Prior Publication Data

US 2017/0242233 A1    Aug. 24, 2017

(30) Foreign Application Priority Data

Feb. 19, 2016    (DE) .................. 10 2016 202 582

(51) Int. Cl.
*G02B 21/26*    (2006.01)
*G12B 5/00*    (2006.01)
(Continued)

(52) U.S. Cl.
CPC ............ *G02B 21/26* (2013.01); *G02B 21/34* (2013.01); *G12B 5/00* (2013.01); *G02B 7/005* (2013.01)

(58) Field of Classification Search
CPC .......... G02B 7/00; G02B 7/004; G02B 21/00; G02B 21/24; G02B 21/26; G02B 21/32; G02B 21/34; G02B 21/362
See application file for complete search history.

(56) References Cited

U.S. PATENT DOCUMENTS 3,424,413 A     1/1969  Applegate
5,323,712 A *   6/1994  Kikuiri ................ B23Q 1/48
                                                    108/138
(Continued)

FOREIGN PATENT DOCUMENTS

DE    296 18 149    1/1997
DE    197 42 205    3/1998
(Continued)

OTHER PUBLICATIONS

European Search Report for Application No. 17155871 dated Jun. 23, 2017.
(Continued)

*Primary Examiner* — Thong Nguyen
(74) *Attorney, Agent, or Firm* — Haug Partners LLP

(57) ABSTRACT

An adjusting mechanism of a sample holder is provided. The adjusting mechanism includes a base with drives arranged thereon, and a carrier that is adjustable by means of the drives and is designed to receive the sample holder. A coupling element for each drive, which coupling element is designed to connect the base and the carrier. Each coupling element has at least one linear degree of freedom and also a rotary degree of freedom. The carrier is linearly movable, by means of the coupling elements, along a respective movement axis directed from the coupling element to the carrier. Also provided is a microscope that includes such an adjusting mechanism, along with a method for adjusting the orientation of a sample holder.

9 Claims, 5 Drawing Sheets

(51) Int. Cl.
*G02B 21/34* (2006.01)
*G02B 7/00* (2006.01)

(56) References Cited

U.S. PATENT DOCUMENTS

| | | | | |
|---|---|---|---|---|
| 5,325,010 | A * | 6/1994 | Besocke | B25J 7/00 |
| | | | | 250/442.11 |
| 6,677,565 | B1 | 1/2004 | Wahl et al. | |
| 6,888,620 | B2 * | 5/2005 | Lee | G03F 7/707 |
| | | | | 355/53 |
| 2002/0131167 | A1 | 9/2002 | Nguyen et al. | |

FOREIGN PATENT DOCUMENTS

| | | |
|---|---|---|
| DE | 10 2013 105 586 | 12/2014 |
| DE | 10 2013 112 600 | 5/2015 |
| JP | H09-318506 | 12/1997 |

OTHER PUBLICATIONS

German Search Report for Application No. 10 2016 202 582.1 dated Jul. 27, 2016.

* cited by examiner

ADJUSTING MECHANISM OF A SAMPLE HOLDER, MICROSCOPE WITH ADJUSTING MECHANISM, AND METHOD

The present application claims priority from German Patent Application No. 10 2016 202 582.1 filed on Feb. 19, 2016, the disclosure of which is incorporated herein by reference in its entirety.

FIELD OF THE INVENTION

It is noted that citation or identification of any document in this application is not an admission that such document is available as prior art to the present invention.

The invention relates to an adjusting mechanism. The invention further relates to a microscope comprising the adjusting mechanism, and to a method for adjusting the orientation of a sample holder.

In high-end microscope systems, of which the objectives have high numerical apertures (also referred to hereinafter as NA) (e.g. laser scanning microscopes, high-resolution systems, super-resolution systems, appliances for carrying out total internal reflection fluorescence (TIRF) microscopy), the orientation of transparent objects present in the beam path, but in particular of a cover glass with which a sample to be observed is covered, plays an important role in terms of the resolution that is achieved.

Thus, a cover glass that is inclined with respect to the optical axis of the microscope leads to undesired aberrations such as astigmatism and coma, especially in water immersion objectives.

Such aberrations occur in particular in systems whose design already provides for an inclination of the optical axis with respect to the cover glass, for example. Inclined passes of the beam path through an optically effective element such as the cover glass are provided, for example, in variants of selective plane illumination microscopy (SPIM). In these variants, aberrations that occur are corrected with special correction elements, as are described, for example, in DE 10 2013 112 600 A1 and DE 10 2013 105 586 A1.

The function of the correction strongly depends on the shape and the position of the cover glass. In particular, the position of the cover glass relative to the optical axis of the imaging system can vary greatly in practice. Although a design of sample holder can be provided whose orientation is ensured by virtue of its dimensions, the cover glass is only a component part of the sample holders used in microscopy (e.g. Petri dishes, microtiter plates, object carriers) and may be oriented independently of the orientation of the sample holder. Whereas the sample received in the sample holder is held in a more or less defined manner over the respective main body of the sample holder, the orientation of the actual cover glass relative to this main body, and therefore also relative to the optical axis of the microscope, is undefined and may vary from sample to sample, even in the same sample holders.

DE 296 18 149 U1 discloses an adjusting mechanism in which a carrier element is coupled to a base via six coupling elements, which each have two linear and three rotary degrees of freedom and are connected to a linear drive. The drives of the adjusting mechanism are arranged on the base. The position of the base-side articulation points of the coupling elements can be modified via the drives.

On account of the large installation space needed, the hexapod described in DE 296 18 149 U1 is unsuitable for use in light microscopy using optics of high numerical aperture and is designed to carry and orient devices of considerable weight and size, such as flight simulators and driving simulators, work heads of machine tools, and devices used for assembling or machining. Such a hexapod is very expensive to produce and is complicated in terms of its control.

SUMMARY OF THE INVENTION

An object of the invention is to propose a device and a method for the orientation of a sample holder, by means of which device and method the known disadvantages of the prior art are reduced or even avoided.

The adjusting mechanism of a sample holder comprises a base, with drives arranged thereon, and also a carrier, wherein the carrier is adjustable by means of the drives and the carrier is designed to receive the sample holder. For each drive, a coupling element is present which is designed to connect base and carrier, wherein each coupling element has both at least one linear degree of freedom and also at least one rotary degree of freedom.

An adjusting mechanism according to the invention is characterized in that the carrier is linearly movable, by means of the coupling elements, along a movement axis directed from the coupling element to the carrier.

In an advantageous embodiment of the adjusting mechanism, the movement axes intersect virtually at a pivot point or near a pivot point of the carrier. Advantageously, the intersection point of the movement axes and/or the pivot point lie(s) within the viewing field of a microscope that is equipped with the adjusting mechanism. The positioning of the intersection point and/or of the pivot point within the viewing field supports a precise orientation of the sample holder.

It is advantageous if three drives are present. Such an embodiment of the adjusting mechanism permits a precise orientation of the sample holder with a small number of drives. Moreover, the required installation space is small, and the adjusting mechanism can be used, for example, both in an upright position and also in an inverted position in a microscope.

The adjusting mechanism is advantageously designed to provide adjustment travel with a high level of precision. The substantially perpendicular setting of the drive axes supports a precise adjustment by avoiding lateral movement components.

The carrier and the carrier surface can have any desired shape and, for example, can be rectangular, round, oval, triangular, polygonal and of an irregular shape. It is advantageous if three drives are arranged at angles of 120° to one another in one plane and thereby span an equilateral triangle. Such an arrangement of the drives permits a substantially symmetrical and hence advantageous distribution and compensation of any bending forces/bending moments of the carrier (tilting forces).

In further possible embodiments, the drives span a right-angled or an isosceles triangle as the carrier surface. If the drives are arranged in such a way that the carrier surface is triangular, a space-saving arrangement of the drives is possible.

In one possible embodiment of the adjusting mechanism, the pivot point is at the same time the area centroid of the carrier surface. This minimizes the lateral offset of the pivot point in the case of an advancing movement generated by means of the drives. For example, if the optical axis of a microscope is directed to the pivot point, the latter remains completely or substantially on the optical axis despite the advancing movement.

Further embodiments of the adjusting mechanism can have a pivot point which lies outside the area centroid, as a result of the intersection point of the movement axes being fixed. The adjusting mechanism can therefore be configured for different uses through the choice of the position of the movement axes. By means of defined advancing movements of the individual drives, the pivot point can be placed in any desired position and maintained despite leveling.

Moreover, in a further embodiment, it is possible that the base and/or the carrier is/are mounted rotatably, such that base and/or carrier or the adjusting mechanism is/are additionally rotatable and/or tiltable.

In one of its embodiments, the adjusting mechanism can be used in a microscope.

In an advantageous embodiment of the microscope, the pivot point lies on the optical axis of the microscope, such that it remains in the focus position despite a tilting movement of the sample holder.

The method according to the invention serves for adjusting the orientation of a sample holder relative to a reference axis or a reference plane.

For example, the reference axis is the optical axis of an optical appliance, in particular of a microscope. The reference plane is, for example, a plane in which the base or the carrier extends. The reference axis and/or the reference plane can be chosen freely.

The method is one in which a current orientation of the sample holder is detected in a microscope that comprises an adjusting mechanism in one of the possible embodiments, wherein an optical axis of the microscope is directed through the sample holder. A current orientation of an optically effective element of the sample holder is detected through which the optical axis is directed. The detected current orientation of the optically effective element is compared with an orientation and/or position of the reference axis or of the reference plane and, in the case of a divergence of the current orientation of the optically effective element from the reference axis or the reference plane greater than a predetermined admissible divergence tolerance, the orientation of the sample holder is modified in a controlled manner in such a way that the divergence of the current orientation of the optically effective element from the reference axis or the reference plane is less than the divergence tolerance.

The adjusting mechanism according to the invention, the microscope with such an adjusting mechanism, and the method advantageously permit a precise and rapid adjustment of the orientation, for example the inclination of the sample holder and of the optically effective element. The invention is suitable in particular for use with objectives of high numerical apertures which have a small work spacing. The adjusting mechanism and the method can be used for upright, inverted and lateral configurations of optical appliances, in particular of the microscope.

The adjusting mechanism and the method can be combined with all positioning possibilities of the microscope, for example focussing, lateral displacement of the sample holder, and with add-on modules such as piezo stages and/or incubators. The orientation of the sample holder can advantageously be automated.

Further advantages of the adjusting mechanism and of the method lie in the possibility of precise adjustment in the direction of the Z-axis and in an inclination adjustment.

The adjusting mechanism can be designed, for example, in such a way that the drives are used mainly for an orientation of the inclination. In such an embodiment, small movement ranges of the drives and/or of the coupling elements are advantageously needed, as a result of which less space is needed and the production costs are reduced.

It is also possible to carry out angle sections or angle scans. Pronounced tilting movements of the carrier relative to the reference axis or to the reference plane are effected here. These angle sections or angle scans permit an observation of the sample from different directions.

DETAILED DESCRIPTION OF EMBODIMENTS

Figure 1:
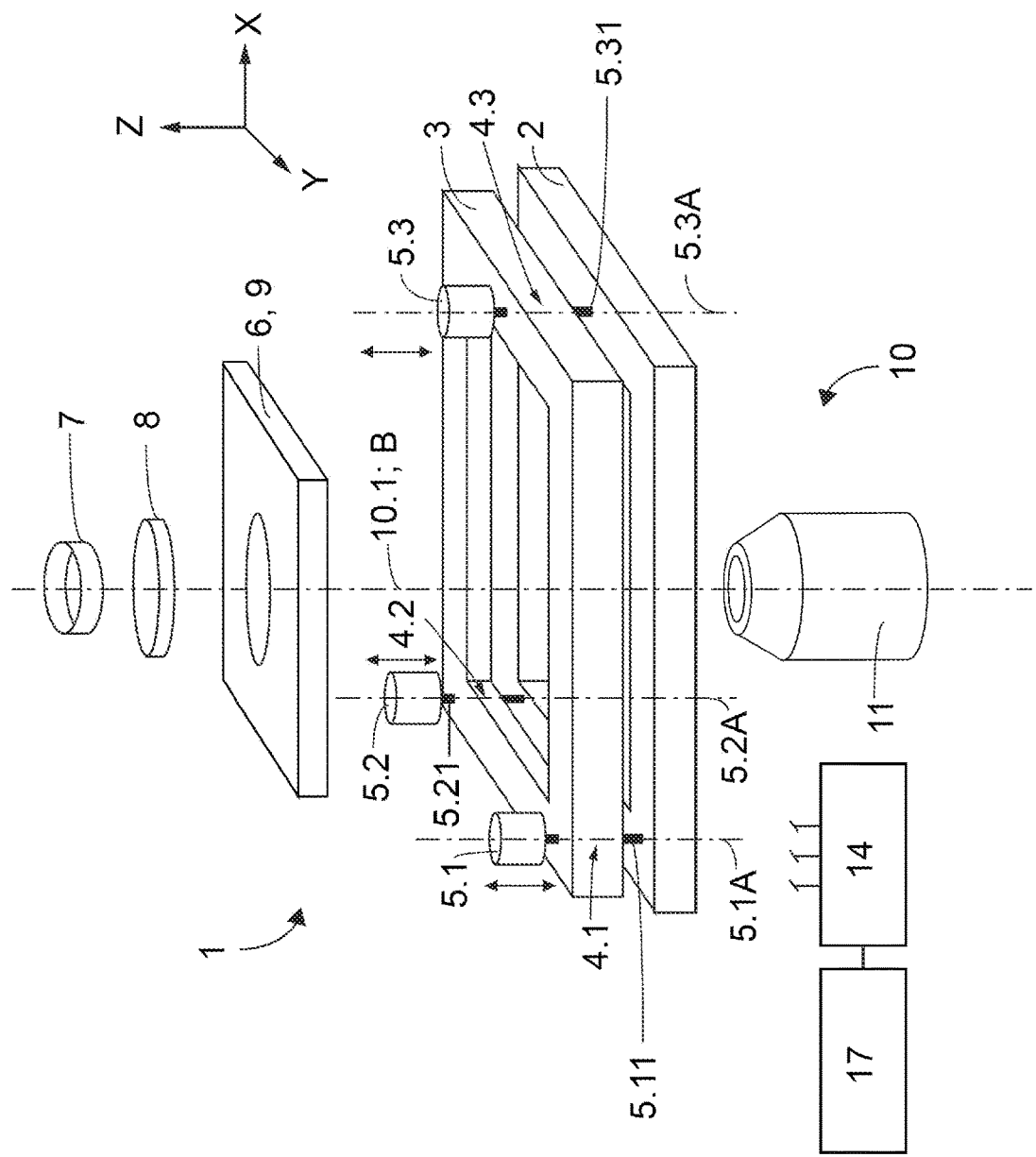
FIG. 1 shows a schematic view of a first illustrative embodiment of an adjusting mechanism and of a microscope with the adjusting mechanism.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The adjusting mechanism of a sample holder comprises a base, with drives arranged thereon, and also a carrier, wherein the carrier is adjustable by means of the drives and the carrier is designed to receive the sample holder. For each drive, a coupling element is present which is designed to connect base and carrier, wherein each coupling element has both at least one linear degree of freedom and also at least one rotary degree of freedom.

An adjusting mechanism according to the invention is characterized in that the carrier is linearly movable, by means of the coupling elements, along a movement axis directed from the coupling element to the carrier.

In an advantageous embodiment of the adjusting mechanism, the movement axes intersect virtually at a pivot point or near a pivot point of the carrier. Advantageously, the intersection point of the movement axes and/or the pivot point lie(s) within the viewing field of a microscope that is equipped with the adjusting mechanism. The positioning of the intersection point and/or of the pivot point within the viewing field supports a precise orientation of the sample holder.

A sample holder is, for example, an object carrier, a Petri dish, a multi-well plate or a microtiter plate or portions thereof, strips of several sample containers, cuvettes, so-called PCR tubes and the like.

The sample holder can comprise an optically effective element. For example, a sample placed in the sample holder is covered or can be covered with a cover glass. The cover glass is in this case the optically effective element. Further optically effective elements can be, for example, lids, films or caps that are transparent to an observation radiation.

A base is, for example, a bottom plate, a one-part or multi-part profile element, or components which are arranged with respect to each other in a defined spatial relationship and are designed to receive the drives. The base can be designed, for example, in the form of a frame, such that the sample holder or the sample to be observed in the sample holder is not covered by the base, and observation of the sample is also possible from the direction of the base.

The drives are connected to the base in a set position, i.e. in a fixed or rigid manner. For example, they can be screwed, pinned, plugged, clamped, bonded, soldered, welded and/or riveted onto the base.

The carrier is adjustable, by means of the driven coupling elements, in the direction of each of the axes of a Cartesian system of coordinates.

It is advantageous if three drives are present. Such an embodiment of the adjusting mechanism permits a precise orientation of the sample holder with a small number of drives. Moreover, the required installation space is small, and the adjusting mechanism can be used, for example, both in an upright position and also in an inverted position in a microscope.

The drives each have a drive axis along which an advancing movement of the drive is or can be effected, which advancing movement is transmitted or transmittable to the coupling element. The drive axes are in this case directed substantially parallel to one another and perpendicular to the base. Drive axes with divergences of up to 5° in terms of their parallelism or their orthogonality to the base are considered as being parallel or orthogonal.

The adjusting mechanism is advantageously designed to provide adjustment travel with a high level of precision. The substantially perpendicular setting of the drive axes supports a precise adjustment by avoiding lateral movement components.

For this purpose, at least one of the drives, advantageously all of the drives, can be provided with a drive spindle, of which the longitudinal axis coincides with the drive axis of the drive. The drive spindle can be provided with a suitable thread, for example with a fine thread.

Any linear drives, and rotary drives with means for converting a rotation movement into a linear movement, are suitable as the drives. Possible drives are step motors with spindle drive (spindle on the inside or outside); piezo-based drives; piezo stacks (only for tilt correction); piezo linear motors, e.g. stepper drives, stick-slip drives, ultrasound drives; linear servo drives; linear synchronous drives; linear step motors or voice coil drives.

The drive spindles can be loaded by springs, for example by tension springs or compression springs, in order to counteract disadvantageous effects of gravity or in order to compensate for any bearing play that may be present. For example, such a configuration reduces the loading of the drive spindle and/or of a motor shaft of the drive.

In simple embodiments, the drive spindles themselves serve as a guide or guide element of the coupling element.

In further embodiments, the drive spindles can be combined with a guide that acts in the direction of the Z-axis.

Moreover, the drives can have a multi-part construction (stacked actuators). For example, a portion of a spindle drive and/or of a drive spindle is designed for a rough adjustment in the direction of the Z-axis and for rough orientation of the inclination. A portion adjacent to this is then formed which, for example, is present in the form of a piezo actuator and which serves for rapid and fine orientation of the inclination.

The drive spindles can have a ball joint at their carrier-side end.

Alternatively, the drive spindles can have a rounded and preferably hardened or coated end face. The end face (dome) presses against a bearing surface of the carrier. Spring elements designed as tension springs, with which suitably strong tensile forces can be effected, serve to generate and to maintain a permanent counter-pressure of the carrier against the end face of each of the drive spindles.

Spring elements of this kind are able to compensate for any play that exists in bearings and/or in the thread/nut pairings of the drives.

All of the drives can be provided with means for position detection or can be connected to such means.

The drives are arranged, for example, in such a way that corner points or end points of a carrier surface of the carrier are defined by the drives, in particular by their respective drive axes. The pivot point lies on the carrier surface.

The carrier and the carrier surface can have any desired shape and, for example, can be rectangular, round, oval, triangular, polygonal and of an irregular shape. It is advantageous if three drives are arranged at angles of 120° to one another in one plane and thereby span an equilateral triangle. Such an arrangement of the drives permits a substantially symmetrical and hence advantageous distribution and compensation of any bending forces/bending moments of the carrier (tilting forces).

In further possible embodiments, the drives span a right-angled or an isosceles triangle as the carrier surface. If the drives are arranged in such a way that the carrier surface is triangular, a space-saving arrangement of the drives is possible.

In one possible embodiment of the adjusting mechanism, the pivot point is at the same time the area centroid of the carrier surface. This minimizes the lateral offset of the pivot point in the case of an advancing movement generated by means of the drives. For example, if the optical axis of a microscope is directed to the pivot point, the latter remains completely or substantially on the optical axis despite the advancing movement.

Further embodiments of the adjusting mechanism can have a pivot point which lies outside the area centroid, as a result of the intersection point of the movement axes being fixed. The adjusting mechanism can therefore be configured for different uses through the choice of the position of the movement axes. By means of defined advancing movements of the individual drives, the pivot point can be placed in any desired position and maintained despite leveling.

The carrier can be a sample stage which is designed to receive commercially available multi-well plates, object carriers and/or Petri dishes.

The carrier is additionally combined, or able to be combined, with a piezo stage.

A linear movement of the carrier in the direction of the movement axes, said movement serving for compensation and being caused by possible different vertical positions of the individual coupling elements, can be achieved for example by a sliding bearing of parts of the coupling joint or by a combination of bearings with different degrees of freedom. For example, in one design of the adjusting mechanism, an oscillating ball bearing for a pivoting movement and a sliding or linear ball bearing for linear movements can be combined.

In further embodiments, combinations of flexures and/or their combination with sliding and/or ball bearings are also possible.

In a further embodiment of the adjusting mechanism, the coupling element is in the form of a bolt which is movable along the movement axis and designed to slide movably in a bore and/or a guide in the carrier and/or in a bore in a ball joint, for example in a ball of the ball joint. Bolt and ball joint together form the coupling element.

Each of the bolts has a longitudinal axis which advantageously coincides with the respective movement axis, as a result of which a linear movement of the base and of the carrier relative to each other is permitted along the movement axis.

In a further embodiment of the adjusting mechanism, the bolt is additionally mounted so as to be tiltable. For example, a combination of a sliding bearing and of a further ball or of a further ball joint or of a ball bearing can permit an additional rotation and/or tilting movement of base and/or carrier.

Moreover, in a further embodiment, it is possible that the base and/or the carrier is/are mounted rotatably, such that base and/or carrier or the adjusting mechanism is/are additionally rotatable and/or tiltable.

In one of its embodiments, the adjusting mechanism can be used in a microscope.

In an advantageous embodiment of the microscope, the pivot point lies on the optical axis of the microscope, such that it remains in the focus position despite a tilting movement of the sample holder.

The method according to the invention serves for adjusting the orientation of a sample holder relative to a reference axis or a reference plane.

For example, the reference axis is the optical axis of an optical appliance, in particular of a microscope. The reference plane is, for example, a plane in which the base or the carrier extends. The reference axis and/or the reference plane can be chosen freely.

The method is one in which a current orientation of the sample holder is detected in a microscope that comprises an adjusting mechanism in one of the possible embodiments, wherein an optical axis of the microscope is directed through the sample holder. A current orientation of an optically effective element of the sample holder is detected through which the optical axis is directed. The detected current orientation of the optically effective element is compared with an orientation and/or position of the reference axis or of the reference plane and, in the case of a divergence of the current orientation of the optically effective element from the reference axis or the reference plane greater than a predetermined admissible divergence tolerance, the orientation of the sample holder is modified in a controlled manner in such a way that the divergence of the current orientation of the optically effective element from the reference axis or the reference plane is less than the divergence tolerance.

The adjusting mechanism according to the invention, the microscope with such an adjusting mechanism, and the method advantageously permit a precise and rapid adjustment of the orientation, for example the inclination of the sample holder and of the optically effective element. The invention is suitable in particular for use with objectives of high numerical apertures which have a small work spacing.

The adjusting mechanism and the method can be used for upright, inverted and lateral configurations of optical appliances, in particular of the microscope.

The adjusting mechanism and the method can be combined with all positioning possibilities of the microscope, for example focussing, lateral displacement of the sample holder, and with add-on modules such as piezo stages and/or incubators. The orientation of the sample holder can advantageously be automated.

On account of the small amount of space taken up, the adjusting mechanism according to the invention provides room for the incubators and/or other devices for manipulation of samples.

The motorized three-point bearing makes it possible, with a small number of drives, to achieve a precise orientation of the sample holder and an advancing movement of the carrier in the direction of the Z-axis. High tilting moments, of the kind that occur in microscopes according to the prior art, are advantageously avoided at this location.

Further advantages of the adjusting mechanism and of the method lie in the possibility of precise adjustment in the direction of the Z-axis and in an inclination adjustment.

The use of drives of an identical kind permits cost-effective production and maintenance of the adjusting mechanism. The orientation both of the inclination in the direction of the X-axis and Y-axis and also an adjustability in the direction of the Z-axis can advantageously be combined such that the inclination of the adjusting mechanism, of the sample holder and of the optically effective element is permitted with constant inclination without an adjustment in the direction of the Z-axis and an adjustment in the direction of the Z-axis. By suitable control and arrangement of the drives, tilting movements can be realized about any desired point of the carrier.

At least two of the drives can be controlled synchronously, as a result of which, for example, a rapid adjustment of inclination and/or an advance in the direction of the Z-axis is permitted.

If the drives are arranged symmetrically, they cause identical movement ratios, and therefore a differential control can be easily programmed and performed.

In particular in the case of an orientation in the direction of the X-axis and Y-axis (inclination), only very slight systematic orientation errors have to be compensated.

The adjusting mechanism affords a lot of space for combinations with carrier attachments such as piezo scanners, incubators, etc. The handling of samples is not spatially limited or is only very slightly limited.

The adjusting mechanism can be designed, for example, in such a way that the drives are used mainly for an orientation of the inclination. In such an embodiment, small movement ranges of the drives and/or of the coupling elements are advantageously needed, as a result of which less space is needed and the production costs are reduced.

It is also possible to carry out angle sections or angle scans. Pronounced tilting movements of the carrier relative to the reference axis or to the reference plane are effected here. These angle sections or angle scans permit an observation of the sample from different directions.

The reference signs used in the figures described below each designate identical elements. Directions are designated by means of the axes of a Cartesian system of coordinates, of which the X-axis X and Y-axis Y span a plane X-Y, in relation to which a base 2 is arranged in parallel.

FIG. 1 shows a schematic view of a first illustrative embodiment of an adjusting mechanism 1, in which the base 2 and a carrier 3, each in the form of a frame, are arranged one over the other and are connected to each other via a first coupling element 4.1, a second coupling element 4.2 and a third coupling element 4.3, wherein the three coupling elements 4.1, 4.2 and 4.3 are not shown in any detail.

A first drive 5.1 having a first drive spindle 5.11 extending along a first drive axis 5.1A, a second drive 5.2 having a second drive spindle 5.21 extending along a second drive axis 5.2A, and a third drive 5.3 having a third drive spindle 5.31 extending along a third drive axis 5.3A are connected to the base 2. The drives 5.1 to 5.3 are connected to the base 2 via the drive spindles 5.11 to 5.31, wherein the base-side ends of the drive spindles 5.11 to 5.31 are connected to the base 2 so as to be fixed in the X-direction X and Y-direction Y but rotatable about the respective drive axis 5.1A to 5.3A, for example by being plugged into them. The drive axes 5.1A to 5.3A are parallel to one another and orthogonal to the base 2.

A piezo scanner 9 is insertable as a sample holder 6 into the carrier 3. An optically effective element 8 in the form of a cover glass is insertable into the sample holder 6. A sample 7 to be observed or to be examined can be arranged on the optically effective element 8. For example, the sample 7 can be laid, sprayed, dropped (pipetted) or coated onto the optically effective element 8. In the specific case of cells, these can be placed on the optically effective element and cultivated.

In further embodiments, the piezo scanner 9 is designed to receive a separate sample holder 6.

The piezo scanner 9 can be movable along up to three positioning axes and, for example, can be used for rapid z-focussing or for a sample scan. An additional autonomous movement can be generated by means of the piezo scanner 9.

Alternatively, the sample 7 can be positioned and held by means of a sample holder 6 which is secured on the carrier 3 and/or received by the carrier 3. The sample holder 6 is designed to receive the optically effective element 8, for example the glass bottoms of one or more sample vessels in the form of one or more Petri dishes, multi-well chambers, microtiter plates, embedded samples on object carriers behind a cover glass.

FIG. 1 shows an inverse arrangement of a microscope 10, of which only an objective 11 is shown, in order to make matters clearer. An optical axis 10.1 of the microscope 10 is or can be directed to the sample 7 through the optically effective element 8.

In other embodiments, an upright arrangement of the microscope 10 can be realized in which the optical axis 10.1 of the microscope 10 is or can be directed from above onto the sample 7 through the optically effective element 8.

An inclination of the carrier 3, i.e. Its tilting movement about the X-axis X and/or the Y-axis Y, is permitted by means of the drives 5.1 to 5.3.

By controlling the drives 5.1 to 5.3 synchronously and in the same direction, an adjustment of the carrier 3 is possible in the direction of the Z-axis Z, for example for focussing the sample 7 through the microscope 10.

For this purpose, the drives 5.1 to 5.3 are connected to a control unit 14, by means of which commands are generated and can be transmitted to the respective drives 5.1 to 5.3.

The control unit 14 is connected to a sensor arrangement 17 in a manner suitable for the transmission of data, wherein the sensor arrangement 17 is designed to detect a current orientation of the sample holder 6 and/or of the optically effective element 8.

In other embodiments, the base 2 can for its part be designed to be able to be positioned laterally, i.e. in the direction of the X-axis X and/or of the Y-axis Y.

For example, such adjustability of the base 2, and therefore of the adjusting mechanism 1, permits a lateral positioning of a sample or a sample exchange, for example an automated sample exchange.

Further embodiments of the adjusting mechanism 1 can alternatively or additionally permit an axial positioning of the base 2 in the direction of the Z-axis Z, for example with the base 2 being adjustable by means of a further drive (not shown).

Figure 2:
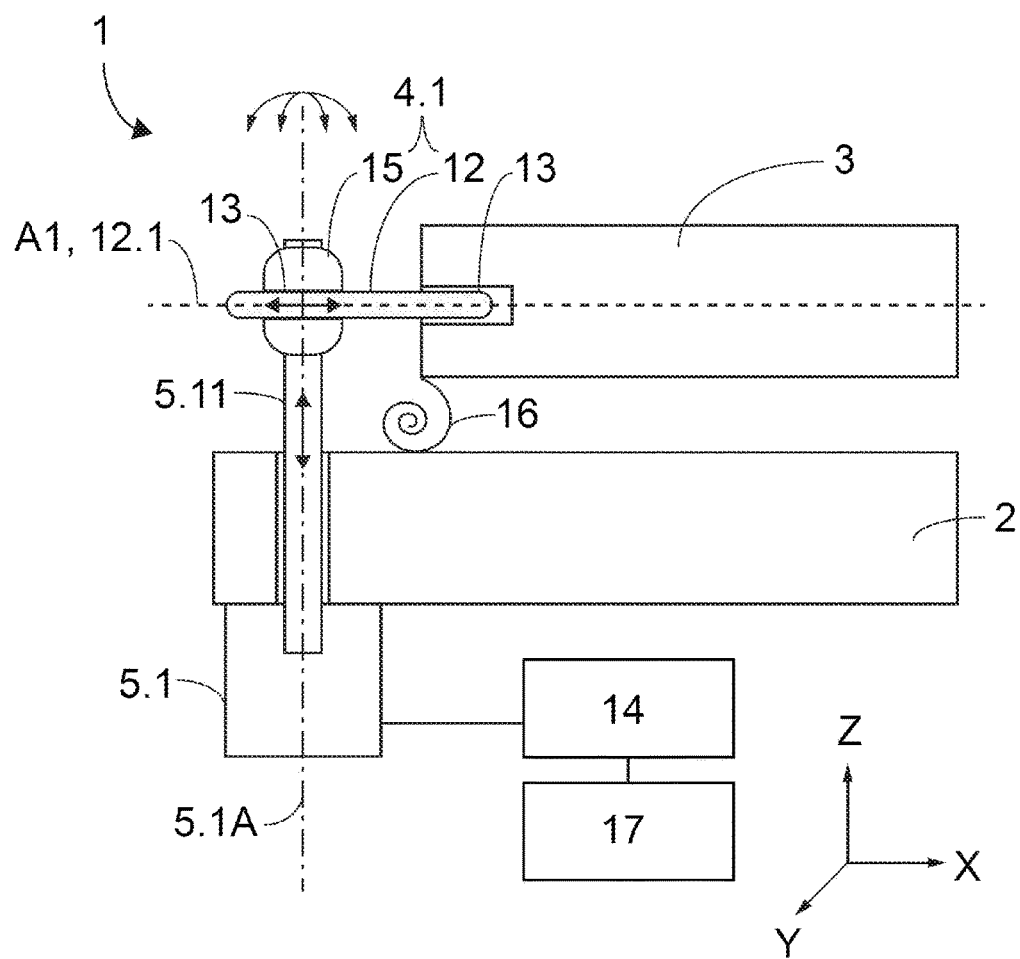
FIG. 2 shows a schematic partial view of a second illustrative embodiment of the adjusting mechanism in a lateral cross-sectional view.

The detail of a second illustrative embodiment of the adjusting mechanism 1 shown in a cross-sectional view in FIG. 2 has a drive 5.1 which is secured on the base 2 and of which the drive spindle 5.11 is directed along the first drive axis 5.1A in the direction of the Z-axis Z.

The following description relates, for example, to the first drive 5.1 and to the elements associated with the latter, and it accordingly also applies to further drives 5.1, 5.2, 5.3 to 5.*n* that are present.

A ball joint 15 with a bolt 12, which together form the first coupling element 4.1, are present at the carrier-side end of the drive spindle 5.11. A bore 13, in which the bolt 12 is mounted so as to be movable along its longitudinal axis 12.1, extends through the ball joint 15.

The bolt 12 engages with one of its ends in a horizontal bore 13 which is present in an end face of the carrier 3. The bore 13 has an internal diameter which is greater than an external diameter of the bolt 12, such that the bolt 12 is movable along its longitudinal axis 12.1 in the bore 13 of the carrier 3.

In further embodiments, the bolt 12 is clamped in the bore of the carrier 3 and is mounted movably only in the bore 13 of the ball joint 15.

In further embodiments, the bolt 12 is clamped in the bore of the ball joint 15 and is mounted movably only in the bore 13 of the carrier 3.

The resulting linear mobility of base 2 and carrier 3 relative to each other takes place in the direction of a first movement axis A1 (symbolized by broken solid lines of a first type), which substantially coincides with the longitudinal axis 12.1 of the bolt.

The linear mobility of base 2 and carrier 3 along the first movement axis A1 permits compensation of changes of distance between drive spindle 5.11 and carrier 3, when the carrier 3 experiences an inclination relative to the base 2.

The ball joint 15 serves as a bearing directly for the bolt 12 and indirectly for the carrier 3. It permits a rotation of the carrier 3 about the first drive axis 5.1A and pivoting movements about any desired axes, within movement ranges dictated by the design of the adjusting mechanism 1.

If the ball joint 15 is provided in possible embodiments with at least one ball bearing or roller bearing, the bearing is advantageously arranged in such a way that forces acting radially on the ball joint 15 can be diverted advantageously in the direction of the first drive axis 5.1A. Bending stresses of the drive spindle 5.11 about the Y-axis Y are advantageously reduced by such a design.

To ensure at all times an advantageous contact between first coupling element 4.1, base 2 and carrier 3, for the purpose of a precise advance, the base 2 and carrier 3 are loaded by a spring element 16 which is arranged between them and which, in the illustrative embodiment, is designed simply as a helical spring, for example, and acts as a compression spring. Further spring elements 16 may be present.

In alternative embodiments, one or all of the spring elements 16 can be, for example, a helical spring, a leaf spring or an elastically deformable element made of rubber, a rubber mixture, a plastic or a composite material, for example comprising a combination of at least two of the materials rubber, plastic and metal. In further embodiments, each spring element 16 can be designed as a tension spring.

Figure 3:
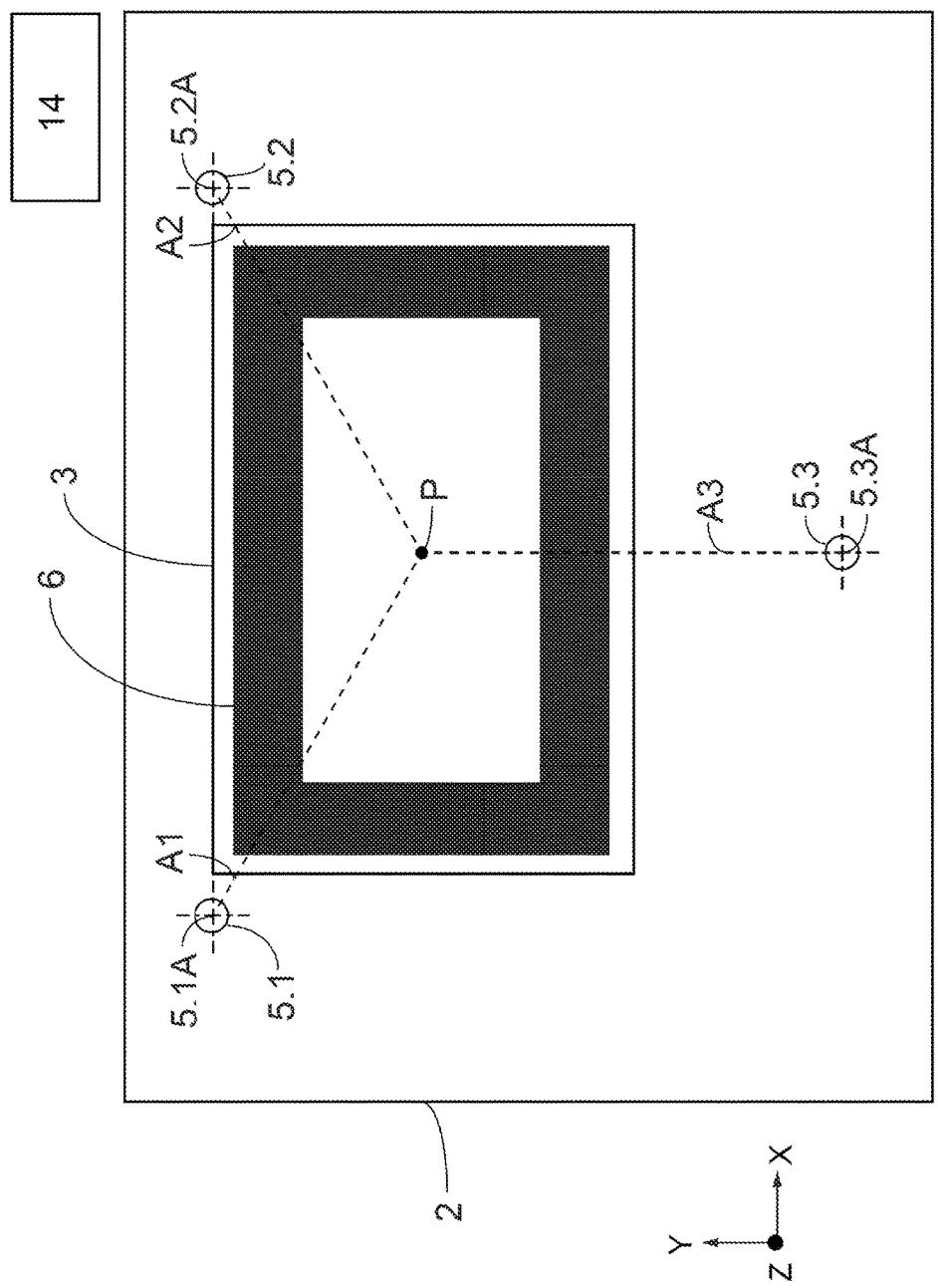
FIG. 3 shows a schematic view of a third illustrative embodiment of the adjusting mechanism in a plan view.

An arrangement of the drives 5.1 to 5.3 on a common orbit, and at an angle of 120° to one another, is shown in FIG. 3 as a third illustrative embodiment. The drives 5.1 to 5.3 form the corner points of a carrier surface 3.1 (see FIGS. 6a to 6d).

The first to third movement axes A1 to A3 intersect at a virtual pivot point P in the carrier surface 3.1, wherein the pivot point P is at the same time the area centroid of the carrier surface 3.1. With the drives 5.1 to 5.3 being controlled by means of the control unit 14, the carrier 3 is tiltable about the X-axis X and/or about the Y-axis Y, or about axes parallel to the X-axis X and/or the Y-axis Y, such that the orientation of a sample holder 6 that is present and of an optically effective element 8 (see FIG. 1), in particular of a cover glass that is present, can be influenced in a controlled manner. At the same time, the pivot point P about which a tilting movement takes place remains unaltered as regards its position in the direction of the Z-axis Z.

Figure 4:
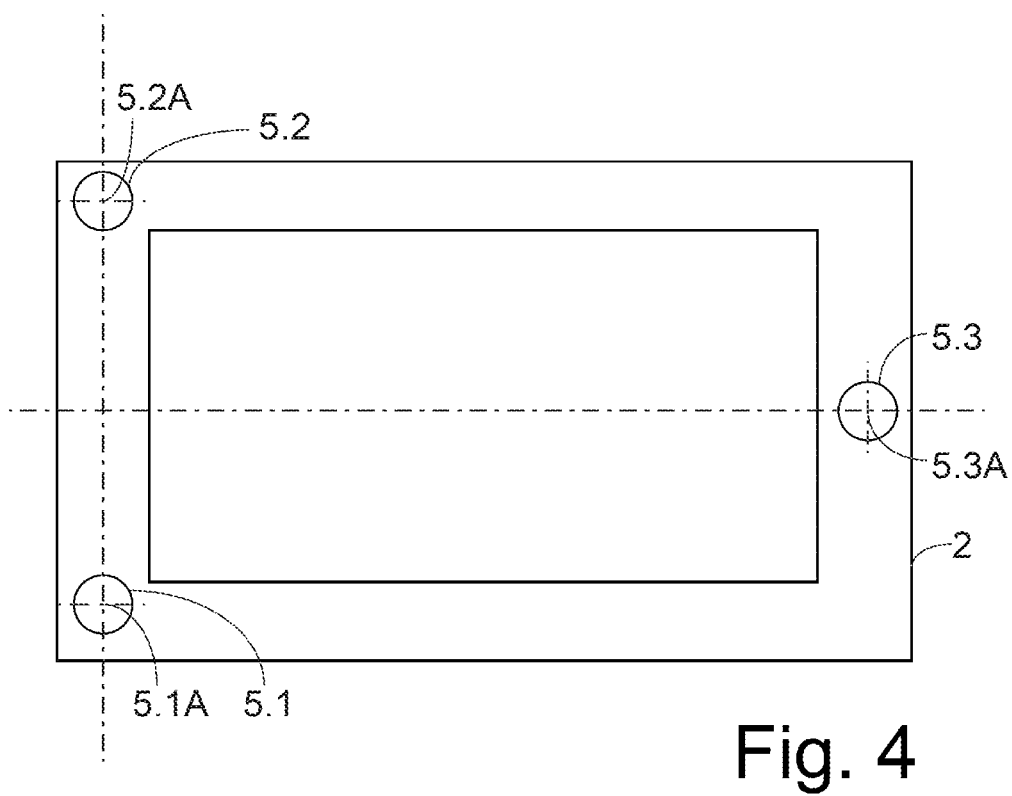
FIG. 4 shows a schematic view of a fourth illustrative embodiment of the adjusting mechanism.

A possible arrangement of the drives 5.1 to 5.3 in a manner that saves space is shown in the plan view of the base 2 in FIG. 4. With specific control of the drives 5.1 to 5.3, the carrier 3 (not shown) is tiltable about the axes symbolized in each case by a dot-and-dash line. If all three drives 5.1 to 5.3 are controlled synchronously and in the same direction, the relative movement between base 2 and carrier 3 takes place only in the Z-axis Z. If only the drive 5.3 is controlled, a tilting movement of the carrier 3 takes place about the dot-and-dash line between the drives 5.1 and 5.2. If the drives 5.1 and 5.2 are controlled simultaneously in opposite directions, the axis shown extending through the third drive 5.3 is movable in parallel.

Figure 5:
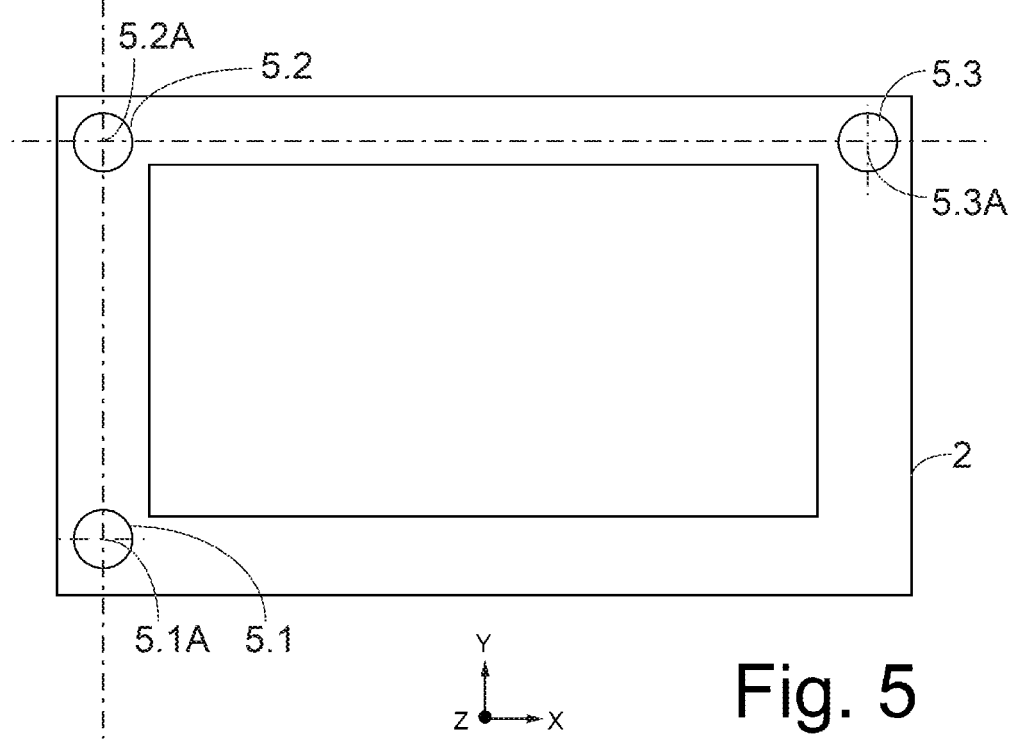
FIG. 5 shows a schematic view of a fifth illustrative embodiment of the adjusting mechanism.

A further possible design of the adjusting mechanism 1 is shown in FIG. 5, in which the drives 5.1 to 5.3 are arranged as corner points of a right-angled triangle.

Different arrangements of the drives 5.1 to 5.3 are shown in FIGS. 6a to 6d. Moreover, the carrier surfaces 3.1 are shown, of which the corner points form the drives 5.1 to 5.3. The carrier surfaces 3.1 are delimited by broken solid lines of a second type.

The movement axes A1 to A3, along which the carrier 3 is linearly movable by means of the coupling elements 4.1 to 4.3, are shown by the broken solid lines of the first type.

The virtual intersection points of the movement axes A1 to A3 in the carrier surface 3.1 are each designated as a pivot point P and are located within a viewing field of a microscope 10 (see FIG. 1).

Figure 6A:
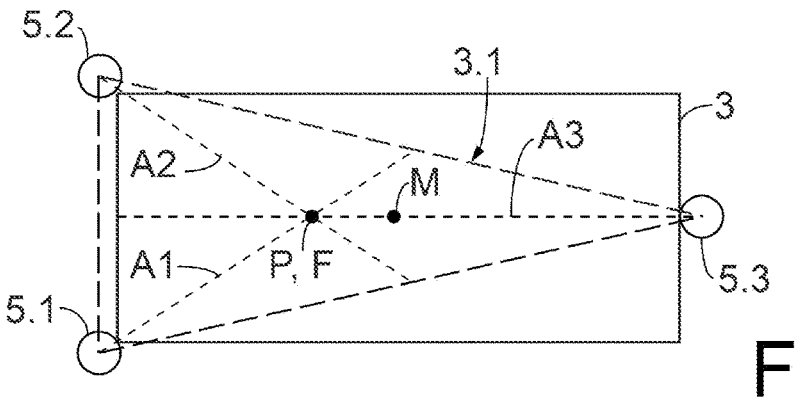
FIG. 6a shows a schematic view of a sixth illustrative embodiment of the adjusting mechanism.

In an arrangement according to FIG. 6a, the drives 5.1 to 5.3 form corner points of a carrier surface 3.1 in the form of an isosceles triangle. The base 2 (not shown) and/or the carrier 3 have a rectangular shape.

Figure 6B:
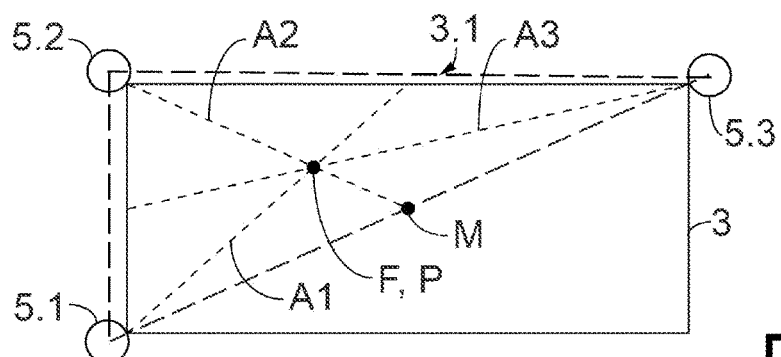
FIG. 6b shows a schematic view of a seventh illustrative embodiment of the adjusting mechanism.
Figure 6C:
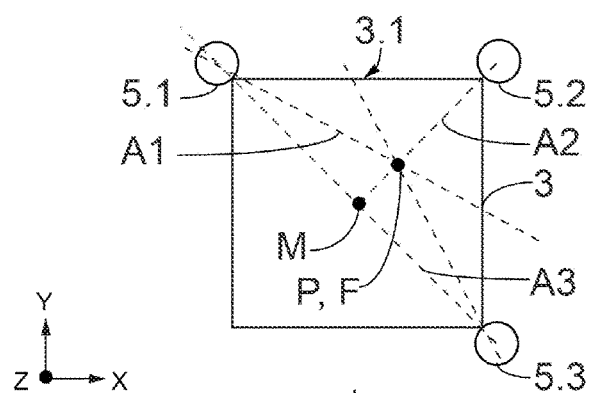
FIG. 6c shows a schematic view of an eighth illustrative embodiment of the adjusting mechanism.

The base 2 (not shown) and/or the carrier 3 of the arrangement option shown in FIG. 6b likewise have a rectangular shape. The drives 5.1 to 5.3 form the corner points of a right-angled triangle.

In the embodiments according to FIGS. 6a to 6d, the pivot point P coincides with the area centroid F of the carrier surface 3.1.

Figure 6D:
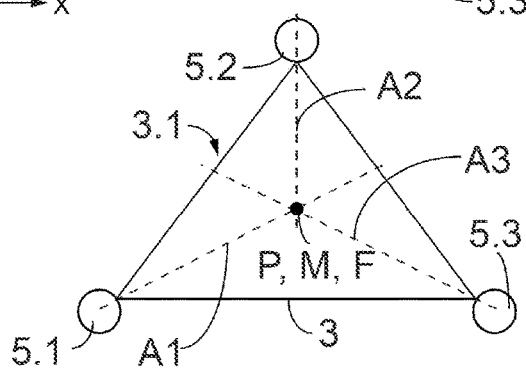
FIG. 6d shows a schematic view of a ninth illustrative embodiment of the adjusting mechanism.

If the base 2 (not shown) and/or the carrier 3 are triangular and if the drives 5.1 to 5.3 form corner points of a triangle, for example of an equilateral triangle, as is shown schematically in FIG. 6d, the pivot point P, the center of gravity M of the carrier 3 and the area centroid F of the carrier surface 3.1 coincide. It is assumed that the carrier 3 has a homogeneous thickness and is made of a homogeneous material or material composite.

The features of the illustrative embodiments can be combined with one another in ways that are routine to a person skilled in the art.

The method for adjusting the orientation of the sample holder 6 is described by way of example with reference to FIGS. 1 and 2.

The sample holder 6 is oriented relative to the optical axis 10.1 of the microscope 10, which optical axis 10.1 serves as a reference axis B.

In alternative embodiments of the method, the orientation takes place relative to a reference plane which, for example, is provided by an X-Y plane XY in which the base 2 extends.

To carry out the method, a microscope 10 is used which comprises an adjusting mechanism 1 in one of the possible embodiments.

A current orientation of the sample holder 6 is detected, wherein the optical axis 10.1 of the microscope 10 is directed through the sample holder 6. The position and direction of the optical axis 10.1 are known or are determined by suitable means, for example by means of position sensors.

A current orientation of the optically effective element 8 of the sample holder 6 is detected by means of the sensor arrangement 17. The optical axis 10.1 is directed through the optically effective element 8.

The detected current orientation of the optically effective element 8 is then compared with the orientation and position of the reference axis or the reference plane.

In the case of a divergence of the current orientation of the optically effective element 8 from the reference axis or from the reference plane, the orientation of the sample holder 6 is modified in a controlled manner in such a way that the divergence of the current orientation of the optically effective element 8 from the reference axis or the reference plane is canceled.

In order to limit the data processing work that is required in practice in association with the orientation, it is advantageous if an admissible divergence tolerance is fixed and the orientation of the sample holder is modified (in a controlled manner) in such a way that the divergence of the current orientation of the optically effective element from the reference axis or from the reference plane is less than the admissible divergence tolerance.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE SIGNS 1 adjusting mechanism
2 base
3 carrier
3.1 carrier surface
4.1 first coupling element
4.2 second coupling element
4.3 third coupling element
5.1 first drive 5.2 second drive
5.3 third drive
5.11 first drive spindle
5.21 second drive spindle
5.31 third drive spindle
5.1A first drive axis
5.2A second drive axis
5.3A third drive axis
6 sample holder
7 sample
8 optically effective element (cover glass)
9 piezo scanner
10 microscope
10.1 optical axis (of the microscope 10)
11 objective
12 bolt
12.1 longitudinal axis of bolt
13 bore
14 control unit
15 ball joint
16 spring element
17 sensor arrangement
A1 first movement axis
A2 second movement axis
A3 third movement axis
B reference axis
P pivot point
F area centroid (carrier surface 3.1)
M center of gravity (of the carrier 3)
X X-direction
Y Y-direction
Z Z-direction
XY X-Y plane

The invention claimed is:

1. An adjusting mechanism for a sample holder comprising:
   a base;
   drives that are on the base;
   a carrier that is configured to receive the sample holder, and that is adjustable by means of the drives; and
   a coupling element for each drive respectively, each coupling element being configured to connect the base and the carrier, and having at least a linear movement and at least a rotation movement;
   wherein the carrier is linearly movable along a respective movement axis directed from each coupling element to the carrier; and
   wherein the carrier is adjustable, by means of the driven coupling elements, in a direction of each of the axes of a Cartesian system of coordinates,
   wherein the movement axes intersect virtually at a pivot point of the carrier, the pivot point being at a centroid area of the carrier surface.

2. The adjusting mechanism according to claim 1;
   wherein the drives are arranged at corner points of a carrier surface, and the pivot point lies on the carrier surface.

3. The adjusting mechanism according to claim 1;
   wherein there are three drives.

4. The adjusting mechanism according to claim 1;
   wherein each of the drives is configured to transmit a movement along a respective drive axis to the respective coupling element; and
   wherein the drive axes are parallel to each other and perpendicular to the base.

5. The adjusting mechanism according to claim 1;
   wherein a respective connection of each coupling element to the carrier is formed by means of a bolt movable along the movement axis.

6. The adjusting mechanism according to claim 1;
   wherein the base and carrier are mounted pivotably, rotatably, or both.

7. A microscope comprising:
   the adjusting mechanism according to claim 1.

8. A method for adjusting an orientation of a sample holder relative to a reference axis or a reference plane, the method comprising:
   providing a microscope according to claim 7;
   detecting a current orientation of the sample holder, wherein an optical axis of the microscope is directed through the sample holder;
   detecting a current orientation of an optically effective element of the sample holder through which the optical axis is directed;
   detecting a current divergence of the current orientation of the optically effective element from the reference axis or the reference plane by comparing the detected current orientation of the optically effective element with an orientation and position of the reference axis or the reference plane; and
   when the detected current divergence is greater than a predetermined divergence tolerance, modifying the current divergence by modifying the orientation of the sample holder in a controlled manner so that the modified divergence of the modified orientation of the optically effective element from the reference axis or the reference plane is less than the predetermined divergence tolerance.

9. A microscope comprising:
   the adjusting mechanism according to claim 1;
   wherein the pivot point lies on an optical axis of a microscope.

* * * * *

UNITED STATES PATENT AND TRADEMARK OFFICE
CERTIFICATE OF CORRECTION

PATENT NO. : 10,088,661 B2
APPLICATION NO. : 15/431894
DATED : October 2, 2018
INVENTOR(S) : Thomas Kalkbrenner et al.

Page 1 of 1

It is certified that error appears in the above-identified patent and that said Letters Patent is hereby corrected as shown below:

In the Specification

At Column 2, Line 49:
"It is advantageous if three drives are arranged at angles of 1200" should read --It is advantageous if three drives are arranged at angles of 120°--

Signed and Sealed this
First Day of January, 2019

Andrei Iancu
*Director of the United States Patent and Trademark Office*